United States Patent [19]

Imai et al.

[11] 3,945,927

[45] Mar. 23, 1976

[54] ION-EXCHANGE GROUP BEARING COMPOSITE MEMBRANES

[75] Inventors: Satoshi Imai; Tamiyuki Eguchi; Masaaki Shimokawa, all of Kobe, Japan

[73] Assignee: Kanegafuchi Kagaku Kogyo Kabushiki Kaisha, Osaka, Japan

[22] Filed: Sept. 10, 1974

[21] Appl. No.: 504,748

Related U.S. Application Data

[63] Continuation-in-part of Ser. No. 361,557, May 18, 1973, Pat. No. 3,912,834.

[30] Foreign Application Priority Data

| June 5, 1972 | Japan | 47-56266 |
| Jan. 20, 1973 | Japan | 48-9085 |
| Sept. 14, 1973 | Japan | 48-104252 |

[52] U.S. Cl. ...... 210/500 M; 260/2.1 E; 260/2.2 R; 210/506; 427/243; 427/340
[51] Int. Cl.$^2$ .................. B01D 39/16; B01D 31/00
[58] Field of Search ............. 117/68, 47 R, 138.8 U, 117/138.8 R, 138.8 E, 138.8 N, 138.8 PV, 138.8 F, 143, 76 F, 161 UN, 166, 63, 47 A, 161 UH; 210/490, 500 M, 506; 260/21 E, 22 R; 204/96; 427/340, 243

[56] References Cited

UNITED STATES PATENTS

| 3,342,729 | 9/1967 | Strand | 210/23 |
| 3,549,016 | 12/1970 | Rigopulos | 210/500 |
| 3,556,305 | 1/1971 | Shorr | 210/490 |
| 3,648,845 | 3/1972 | Riley | 210/490 |
| 3,762,566 | 10/1973 | Del Pico | 210/490 |
| 3,799,355 | 3/1974 | Salyer | 210/500 M |
| 3,808,305 | 4/1974 | Gregor | 210/490 |

*Primary Examiner*—Michael F. Esposito
*Attorney, Agent, or Firm*—James C. Haight

[57] ABSTRACT

Composite membranes bearing ion-exchange groups suitable for use in membrane separation processes are produced by providing a porous substrate which is physically semipermeable by itself, applying a coating composition consisting essentially of a filmforming polymeric material to which ion-exchange groups are introduceable and a liquid medium onto the surface of said substrate, removing said liquid medium to provide an ultrathin membrane of said material having a thickness less than 10 microns, and treating said ultrathin membrane to provide said ion-exchange groups throughout said ultrathin membrane.

19 Claims, No Drawings

ION-EXCHANGE GROUP BEARING COMPOSITE MEMBRANES

This application is a continuation-in-part of our copending application Ser. No. 361,557, filed May 18, 1973, now U.S. Pat. No. 3,912,834.

This invention relates to supported semipermeable membranes having ion-exchange groups and to processes for making such membranes.

One important use of semipermeable membranes having ion-exchange groups is in electrodialysis. It has been known that major portions of electric power are consumed in te dialysis cell in the generation of Joule's heat caused by the electric resistance of the dialysis membrane and cell liquid. Consequently, consumption of electric power may be decreased with the use of electrically less resistant membranes. Since lower electric resistance of the membrane means faster permeance of ions through the membrane, the total length of dialyzing time can also be shortened with the use of such membranes.

As a means for decreasing the electric resistance of membranes, attempts were made to increase molarity of ion-exchange groups, namely the ion-exchange capacity of the membrane. Electric resistance can also be decreased by decreasing membrane thickness.

The former has a certain limit as it necessarily increases swelling pressure. The latter decreases the mechanical strength of membranes, but it may be strengthened by using suitable support means.

Another important application of membranes having ion-exchange groups is in dialysis. As a dialysis membrane, the thinner membrane results in faster permeance of ions through the membrane and a shorter period of dialyzing time. Still other applications of such membranes are in ultrafiltration and reverse osmosis separations. In such uses, the membrane must have a higher flux rate as well as good selectivity.

It has been known that total membrane thickness has substantially no effect on selectivity and a higher flux rate may be obtained without affecting the selectivity by decreasing the effective thickness of the membrane. It has been proposed to provide such membranes with an asymmetric structure thereby decreasing thickness of the portion of active layer of the membrane (see Industrial and Engineering Chemistry Vol.61, No.11, pages 62–88, 1969).

However, the asymmetric structure may be formed only with limited types of membranes and the technique cannot be applied to membranes made of elastic polymers having a low glass transition temperature.

Further, it has been proposed to use membranes having ion-exchange groups in pressure dialysis processes (see U.S. Dept. of Interior, Office of Saline Water, R & D Progress Report No. 452, 1969). These processes utilize membranes having both cationic and anionic ion-exchange groups which permit the permeance of concentrated saline water when subjected to normal saline water under pressure.

Heretofore-available types of membranes have been proved unacceptable for such uses in practice, because the flux rates thereof are too small. It is believed that the flux rate can be increased by decreasing the thickness of the membrane while the mechanical strength is reinforced with the use of a suitable support.

Thus, membranes having ion-exchange groups may find a number of important uses if they are sufficiently thin to give a higher flux rate while possessing a sufficient degree of mechanical strength.

It is very difficult to obtain such membranes having a thickness less than 10 microns by the prior art methods.

For example, Japanese Patent Publication No. 13,009 of 1960 discloses a membrane for use in electrodialysis incorporating a corrosion resistant core therein. The thickness of these membranes is about 150 to 300 microns, whereas a thickness of about 300 to 600 microns is needed to impart sufficient mechanical strength if such a core is not employed.

These types of membranes are not suitable for use in other separation processes as reverse osmosis owing to their lower flux rates.

A method of preparation of thin membranes having ion-exchange groups used for reverse osmosis was published in Journal of Applied Polymer Science Vol. 15, pp. 1665–1677, 1971. In this article, a low-density polyethylene film 15 microns thick is impregnated with an ion-exchange group introducible monomer and the impregnated film is subjected to graft polymerization.

Then ion-exchange groups are introduced into the resulting film.

Alternately, the polyethylene film is impregnated with a monomer having a dissociable group and the impregnated film is subjected to graft polymerization, thereby bonding te dissociable group to the film. Although effects of the treatment on the properties of the membrane sch as swelling, tensile strength or other mechanical strength have not been discussed in this article, it is believed that this membrane has also certain limits in its thickness and ion-exchange capacity as the membrane used for electrodialysis in the prior art wherein the ion-exchange groups are introduced uniformly throughout all directions of the film by graft polymerization. So it is difficult to obtain a membrane thinner than 10 microns of thickness by this method. On the other hand, only a portion of the film may be graft-polymerized to introduce ion-exchange groups thereto.

In this case, other portions remain unchanged and will interfere with the desired permeance through the membrane. Thus the flux rate depends on the nature of this unchanged portion of the membrane and becomes small. It is an object of the present invention to provide selectively permeable membranes having ion-exchange groups supported on microporous backings and methods for making the same.

Another object is to provide such membranes having increased flux rates while retaining good mechanical strength.

According to the present invention, a composite membrane is produced by providing a microporous polymer membrane which is physically semipermeable, and forming a thin layer having ion-exchange groups adjacent the microporous polymer membrane.

The microporous polymer membrane used for the substrate of the composite membrane of the present invention is a selectively permeable film or layer of a film-forming polymer which is itself suitable for use in membrane separations such as ultra-filtration.

The substrate membrane must have a number of continuous micropores through which molecules or ions smaller than the pore size can selectively be permeated.

Such membranes and methods of making same have been well-known in the art. The composite membrane of the present invention may be produced by coating said substrate membrane with a layer of a coating composition comprising a solution or emulsion of a film-forming polymer having reactive sites or groups into which ion-exchange groups can be introduced, removing th solvent or dispersion medium of the coating to provide a ultrathin membrane of said polymer having a thickness less than 10 microns, and introducing said ion-exchange groups into the molecules of said polymer.

Coating with said film-forming, ion-exchange group introducible polymer may be carried out in any per se known manner such as dipping, casting or spraying.

Removal of solvent or dispersion medium for said coating solution or emulsion may be accomplished either by evaporation or by immersing the coating layer in a liquid which is miscible with said solvent or dispersion medium but is a nonsolvent for said polymer and the substrate. As the substrate membranes employed in the present invention consist essentially of a microporous polymer layer, the coating solution or emulsion may not cause plugging of the substrate membrane by dissolving or swelling thereof.

Therefore, a suitable solvent or dispersion medium relatively inert to the substrate membrane is preferably selected for the coating polymer.

It has been found that the resulting composite membrane has good adhesion characteristics between layers against stripping when such porous substrate and solvent or medium are used, whereas such adhesion has never been obtained with the use of the same coating solution or dispersion if the substrate is nonporous.

Further, it is surprising that although the substrate membrane, as will be fully described hereinafter, has too small a pore-size to allow permeance of the coating polymer therethrough, good adhesion characteristics have also resulted. As the substrate membrane which may be employed in practicing the present invention, any microporous membrane made of film-forming polymers may be used, provided they are not soluble nor swellable in the solvent or medium for coating polymers to be applied in the subsequent step and are not susceptible to chemical reactions with agents used during the step for introducing ion-exchange groups into the ultrathin polymer layer.

Polyvinyl chloride is most preferable for such purposes as it may easily form such a microporous structure and is resistant to a wide variety of chemicals.

As the present invention contemplates provision of a composite membrane whose layer having ion-exchange groups is as thin as possible and the substrate membrane merely plays a role of a support thereto, pores perforated through the substrate membrane must have a suitable average pore size and shape.

If the substrate membrane has a large pore size sufficient to allow permeance of coating polymers therethrough, the effective thickness of the membrane having ion-exchange groups will be substantially equal to total thickness of the resulting composite membrane.

On the other hand, if the pore size is too small, the permeance characteristics will depend upon the nature of the substrate membrane.

In order to decrease the effective or controlling thickness imparted to the layer having ion-exchange groups, the pore size of the substrate membrane is preferably sufficient to prevent permeance of the coating polymer while permitting substantially free passage of molecules or ions which have already passed through the layer having ion-exchange groups.

Methods for making such selectively permeable membranes and methods for controlling the pore-size have already been known in the art. As the method for making such membranes, wet processes are generally preferable.

For example, a method for making a selectively permeable composite membrane has been disclosed in a co-pending U.S. patent application Ser. No. 361,557 filed May 18, 1973, now U.S. Pat. No. 3,912,837, by Satoshi Imai et al. to which reference is made. According to this method, a composite selectively permeable membrane is produced by impregnating a textile fabric such as commercial filter cloth prior to applying a film-forming polymer solution thereto with a nonsolvent for the film-forming polymer while the immediate surface of the fabric on which the polymer solution is applied is kept substantially dry, applying a solution of said film-forming polymer in a solvent onto the surface of the fabric to form a film, and diffusing the solvent for said film-forming polymer into a miscible nonsolvent for said polymer. Thus, an asymmeric microporous membrane is formed on the suport fabric. The resulting composite membrane can be used as the substrate of membranes for the present invention to give three layer composite membranes. Two layer composite membranes may be produced by the use of a single layer membrane having a microporous structure.

For example, polyvinyl chloride is dissolved in a suitable solvent. The solution is cast on a glass plate for form a layer and the layer is immersed into a bath filled with a medium which is miscible with the solvent of polyvinyl chloride used and is a nonsolvent for polyvinyl chloride.

The solvent diffuses into the bath to give the desired microporous membrane on the glass plate. Prevention from plugging the substrate membrane thus produced may also be accomplished by selecting a suitable molecular size of the polymer into which ion-exchange groups are introduced.

The substrate membrane is then coated with a solution or emulsion of a polymeric material which may be converted to an ion-exchange during subsequent chemical treatment.

Examples of reactive groups to which ion-exchange groups may be introduced are a benzene ring, double bond, halogen atom, nitrile group, hydroxyl group and the like.

Examples of polymers having such groups are styrene-butadiene copolymers, vinyl chloride-acrylonitrile copolymers, polyvinyl alcohol and the like. Solutions or emulsions of such polymers in a suitable solvent or dispersion medium may be applied in a conventional manner such as dipping, spreading by means of a doctor-knife or spraying. Dipping or spraying is preferred for coating liquids having a viscosity less the 100 centipoise and spreading is preferred for the liquids having a viscosity higher than 300 centipoise.

As previously indicated, the solvent or dispersion medium for the coating polymer preferably has a low affinity to the material of the substrate membrane.

An ultrathin layer of said polymer is formed by removing the solvent or medium for the polymer from the film of the liquid after applying. This may be accomplished by air drying or by immersing the film in a bath filled with a liquid into which the solvent or medium may diffuse. The immersing liquid must be miscible with the solvent or medium and must be a nonsolvent for materials of any layer of the composite membrane. When hot air is used for air-drying, care should be taken not to raise the drying temperature higher than the softening point of the substrate membrane.

The thickness of the layer thus produced, which is substantially equal to that of the layer having ion-exchange groups of the final composite membrane, may be controlled by adjusting the amount of coating.

For example, desired amounts of coating may be obtained by adjusting the feed of coating liquid or the supply speed of substrate membrane using a spreading or spraying method. The thickness may also be controlled by adjusting concentration of the coating liquid in using a dipping or spraying method.

For instance, a microporous polyvinyl chloride membrane is coated with a 2.5% by weight solution of sytrene-butadiene copolymer in cyclohexane by dipping. The resulting ultrathin layer has a thickness of about 1 micron. If the same membrane is coated with a four fold dilution of commercial latex of sytrene-butadiene copolymer (Dow Latex 612), the ultrathin layer formed has a thickness of about 5 microns.

Finally a suitable ion-exchange group is introduced into the ultrathin membrane thus formed.

Examples of such ion-exchange groups are, as is well-known, cation-exchange groups such as sulfonyl groups or carboxyl groups and anion exchange groups such as quaternary ammonium groups or tertiary amino groups.

Appropriate chemical treatment is carried out depending upon the nature of the layer material. Styrene-butadiene copolymers may be sulfonated with concentrated sufuric acid to introduce sulfonyl groups into the benzene ring. Vinyl chloride-acrylonitrile copolymers may be hydrolyzed with 70% sulfuric acid whereby nitrile groups are converted to carboxyl groups. If an amphoteric ion-exchange layer is desired, different types of ion-exchange groups may further be introduced into a membrane which has already been treated in the above manner.

For example, when vinyl chloride-acrylonitrile copolymer is treated in the above-mentioned manner to introduce carboxyl groups, and the resulting membrane is immersed in an aqueous solution of ethylenediamine, chlorine atoms may be exchanged by tertiary amino groups.

Generally, polymeric substances will become hydrophilic when ion-exchange groups are introduced thereto and show a strong swelling pressure in water or an aqueous solution.

Accordingly, the polymeric substances generally tend to dissolve or swell in water unless the polymer is reinforced by cross-linking. Further, it has been known that if strongly hydrophilic ion-exchange groups such as strong cation-exchange or strong anion-exchange groups are introduced to an extent higher than about 2 milliequivalents per one gram of polymer on the dry basis, the resulting polymer becomes very weak in strength even if the polymer has been cross-linked. It has been observed that an SBR membrane having a thickness of about 0.3 mm also became weak and easily burst on handling when the membrane was cross-linked and then treated to introduce about 2 milliequivalents of sulfonyl group per one gram of the polymer on the dry basis.

In accordance with the present invention, the ion-exchange layer of the composite membrane remains unchanged in its shape and size after the treatment for introducing ion-exchange groups even if the polymer has not been cross-linked. Furthermore the membrane has a sufficient strength against stripping between the layers and bursting. However, cross-linking may be carried out if still higher strength is desired.

Although is would be quite natural that the membrane becomes easily strippable after chemically denaturing thereof, no decrease of adhesion strength has in fact been observed in the membranes of the present invention.

For example, an ultrathin SBR membrane of about one micron thickness is coated onto a microporous polyvinyl chloride membrane in the above-described manner and the composite membrane is treated with a 95% concentration mixture of fuming sulfuric acid and concentrated sulfuric acid for 100 hours. No stripping was observed after this treatment. Thus advantages of the membrane of the present invention will be apparent to persons skilled in the art. Membranes produced in accordance with the method of the present invention have been proved to possess an effective thickness substantially equal to the thickness of the layer having ion-exchange groups.

When a photograph of the cross-section of the membrane was taken by electron microscope, it was found that the microporous substrate layer is not plugged and retains a number of continuous micropores of a suitable pore size which will not affect the permeance characteristics of the layer having ion-exchange groups. As already indicated, permeance characteristics of the membranes of the present invention substantially depend upon the thickness of the layer having ion-exchange groups rather than the total thickness, and this effective or controlling thickness can be decreased to less than 10 microns. When such membranes are used in various membrane separation processes, many remarkable advantages may be seen.

For example, they decrease electric power consumption when used for electrodialysis. Furthermore, a remarkable result may be observed when the membranes are used in reverse osmosis or pressure dialysis separations. A composite membrane comprising a microporous polyvinyl chloride substrate layer and a sulfonated SBR layer having a thickness of about 1 micron produced in the hereinafter described Example 1 was further treated with an aqueous solution of epichlorophydrin-pyridine mixture to introduce quaternary ammonium groups in the manner as described in Example 2.

A 3.5% sodium chloride solution was pressure-dialyzed through this membrane under a pressure of 50kg/cm$^2$. The rejection rate decreased to 10% and the flux rate was about 15 gallon/ft$^2$/day.

A 5% sucrose aqueous solution was pressure-dialyzed through the same membrane under a pressure of 50 kg/cm$^2$.

In this case, 80% of the sucrose was rejected and the flux rate was about 11 gallon/ft$^2$/day. It is believed that membranes showing such good characteristics have never been obtained in the past and may find many new uses in pressure dialysis membrane separation.

For Example, if an aqueous solution containing lower molecular weight organic substances and inorganic salts is forced onto the membrane under pressure, concentration of the organic substances and desalting may simultaneously be accomplished. Since the selectivity of the membrane is independent of its thickness, other characteristics may be further increased by decreasing the thickness of the layer having ion-exchange groups below the values illustrated.

Without further elaboration, it is believed that one skilled in the art can, using the preceding decription, utilize the present invention to its fullest extent. The following preferred specific embodiments are, therefore, to be construed as merely illustrative, and not limitive of the remainder of the description in any way whatsoever. All parts and per cents therein are weight basis unless otherwise indiated.

EXAMPLE 1

12 parts of polyvinyl chloride (S1001, Kanegafuchi Kagaku Kogyo K.K. Osaka, Japan, polymerization degree 1,000) was dissolved in a 1 : 7 mixture of tetrahydrofuran and dimethylformamide.

Into this solution was dipped a glass cylinder having a sealed bottom (85mm outer diameter) and drawn up at a speed of 1.7cm/second.

The resulting layer was exposed to the atmosphere at 24°C for 30 seconds and a portion of solvent was allowed to evaporate.

The layer was then immersed into 80% aqueous methanol for 1 hour and the remaining solvent was removed. The resulting membrane showed complete rejection against an aqueous solution of proteins having a molecular weight greater than about 5,000 but showed no rejection against proteins having a molecular weight less then about 1,000. The resulting membrane formed on a glass cylinder was air-dried at 45°C for 1 hour, dipped in a 2.5% solution of SBR(Solprene No.303, Japan Synthetic Rubber Co., Ltd.) in cyclohexane for a few seconds and drawn up at a speed of 1.1cm/second. The resulting thin film was dried at 45°C for 1 hour. The glass cylinder bearing the resulting layers was immersed successively in 91% sulfuric acid for 1 hour and 95% sulfuric acid for 24 hours and the SBR layer was cross-linked and sulfonated.

The resulting membrane was washed successively with 60% sulfuric acid for 3 minutes and water. The washed composite membrane was stripped off from the glass cylinder and stored in an aqueous solution of sodium chloride or sodium hydroxide.

After completion of the preceding steps, no change was observed on the nature of the porous polyvinyl chloride layer and the sulfonated SBR layer had not been stripped off during these steps. Ion-exchange capacity of the composite membrane was estimated by the following manner. An SBR film having a thickness of 0.3mm was sulfonated under the same conditions as above and the ion-exchange capacity was measured. From the result of this model test, the ion-exchange capacity of the resulting composite membrane was estimated as about 2.5 milliequivalent/g. on the dry basis.

A photograph of an enlarged cross-sectional view of the membrane was taken by an electron microscope and the thickness of the ion-exchange layer was measured.

The thickness measured was about one micron and plugging of the porous polyvinyl chloride layer with SBR was not observed.

A test piece 52mm in diameter was taken from the composite membrane and a 0.78% sodium chloride aqueous solution was forced onto the surface of the ion-exchange layer of the test piece under a pressure of 50 kg/cm$^2$. 67% of the sodium chloride was rejected on this test with a flux rate of about 12 gallon/ft$^2$/day.

EXAMPLE 2

The composite membrane produced in Example 1 stored in an aqueous solution of sodium hydroxide was washed with water to remove excess sodium hydroxide. The membrane was immersed in a 50v/v % aqueous solution of a 1 : 1 (molar basis) mixture of epichlorohydrin and pyridine for 2 hours at 31.5°C. By this treatment, amino groups were introduced to the sulfonated SBR layer to give an amphoteric ion-exchange layer.

After completion of this step, no change was observed in the nature of the porous chloride substrate layer and no stripping took place during the step. Although a detailed mechanism for the amination reaction is not fully made clear, it is postulated that hydroxyl groups, the presence of which in the sulfonated SBR layer has been confirmed by I R sectra and elemental analysis, react with epichlorohydrin and pyridine to form quaternized amino groups. The anion-exchange capacity of the resulting membrane was estimated in the same manner as described in Example 1 and was found to be 2 to 2.5 milliequivalent/g on the dry basis.

A test piece 52mm in diameter was taken from the resulting membrane and a 3.5% sodium chloride aqueous solution at 30°C was forced onto the test piece under a pressure of 50 kg/cm$^2$.

10% of sodium chloride was rejected with a flux rate of about 15 gallon/ft$^2$/day. When a 5% sucrose aqueous solution was forced onto the membrane at 30°C under a pressure of 40 kg/cm$^2$.

80% of the sucrose was rejected with a flux rate of about 11 gallon/ft$^2$/day.

EXAMPLE 3

Vinyl chloride-acrylonitrile copolymer (Kanekaron resin, Kanegafuchi Kagaku Kogyo K.K. Osaka, Japan) was dissolved in a saturated ethanolic solution of zinc bromide to a concentration of 1 %. Into this solution was dipped the microporous polyvinyl chloride substrate membrane produced in Example 1 while being mounted on a glass cylinder for 10 minutes, and drawn up at a speed of 1.1cm/second. The membrane was dried at 50°C for 2 hours and washed with water for 30minutes to remove zinc bromide.

The resulting membrane was immersed into 26 N sulfuric acid at 50°C for 2 hours to hydrolyze the nitrile groups into carboxyl groups.

The hydrolyzed membrane was then cross-linked using residual nitrile groups by treating a mixture of aqueous solution of formaldehyde (0.5 ml) and 26 N sulfuric acid (100 ml) at 0°C for 30 minutes. No change was observed in the nature of the porous polyvinyl chloride substrate layer after completion of the preceding steps and stripping did not take place during the operation. Ion-exchange capacity of the resulting membrane was estimated as 3 millequivalent/g. on the dry basis using the same technique as in Example 1.

EXAMPLE 4

The composite membrane produced in Example 3 was thoroughly washed with water. The membrane was immersed in a 20% aqueous solution of ethylenediamine at 50°C for 3 hours, whereby chlorine atoms in said copolymer were substituted by ethylenediamine.

No change was observed in the nature of the porous polyvinyl chloride substrate layer and stripping of the membrane did not take place. Anion-exchange capacity of the resulting membrane was estimated as 1.6 milliequivalent/g. on the dry basis using the same technique as in Example 1. A cross-section of the resulting membrane was observed by electron microscope. The thickness of ultrathin ion-exchange layer was about 5,000 A and pores in the porous substrate layer were scarcely plugged with said vinyl chloride-acrylonitrile resin layer. A 3.5% sodium chloride aqueous solution was forced onto a piece of the resulting composite membrane 52mm in diameter at 30°C under a pressure of 50kg/cm$^2$.

The rejection rate of sodium chloride was 18% and the flux rate was 5.5 gallon/ft$^2$/day. When a 5% aqueous sucrose solution was forced onto the membrane, a rejection rate of 78% and a flux rate of 4.7 gallon/ft$^2$/day were obtained respectively.

EXAMPLE 5

10 parts of polyvinyl chloride (S 1001, Kanegafuchi Kagaku Kogyo K.K. Osaka, Japan, polymerization degree 1,000) was dissolved in 90 parts of dimethylformamide. Into this solution was dipped a glass cylinder having a sealed bottom (85mm outer diameter).

The glass cylinder was drawn up at a speed of 1.2 cm/second and immediately immersed into water for 30 minutes to remove dimethylformamide. The resulting film was dried at 45°C for 1 hour while being mounted on the glass cylinder and dipped in a 4 fold dilution of commercial styrene-butadiene copolymer latex (Dow Latex 612) for a few seconds. The resulting membrane was drawn up at a speed of 1.1 cm/second and dried at 40°C for 2 hours.

The dried membrane was then cross-linked and sulfonated by treating with 90% sulfuric acid for 1.5 hours and 95% sulfuric acid for 24 hours successively.

The resulting membrane was washed successively with 60% sulfuric acid for 3 minutes and with water. The washed composite membrane was stripped from the glass cylinder and stored in a dilute aqueous solution of sodium hydroxide or sodium chloride. An electron microscopic picture revealed that the thickness of the ultrathin ion-exchange layer is about 5 microns.

From the foregoing description, one skilled in the art can easily ascertain the essential characteristics of this invention, and without departing from the spirit and scope thereof, can make various changes and modifications of the invention to adapt it to various usages and conditions.

We claim:

1. A method for preparing a selectively permeable composite membrane having an ultrathin layer of ion exchange polymer film adhered to a polymeric microporous supporting substrate which is permeable to ions and molecules which pass through said ultrathin layer, which comprises:
   a. coating said substrate with a composition consisting essentially of an inert diluent and a film-forming polymer which is substantially impermeable to said substrate and which contains at least on reactive site selected from the group consisting of benzene rings, double bonds, halogen atoms, hydroxyl groups or nitrile groups;
   b. removing said inert diluent to form an ultrathin layer of said film-forming polymer having a dry thickness of less than 10 microns adhered to said substrate; and
   c. converting said ultrathin layer into an ion exchange layer by chemically introducing ion exchange groups into said reactive sites.

2. A method according to claim 1, wherein said ion exchange groups are at least one member selected from the group consisting of sulfonyl, carboxyl, quaternary ammonium and tertiary amino groups.

3. A method according to claim 1, wherein said film-forming polymer is selected from the group consisting of a butadiene-styrene copolymer, a vinyl chloride-acrylonitrile copolymer and a polyvinyl alcohol.

4. A method according to claim 1, wherein said substrate comprises polyvinylchloride.

5. A method according to claim 4, wherein the film-forming polymer is a copolymer of butadiene and styrene.

6. A method according to claim 5, wherein said ion exchange groups are introduced by sulfonating benzene ring reactive sites in said ultrathin layer.

7. A method according to claim 6, further comprising reacting the resultant ion exchange layer with a mixture of epichlorohydrin and pyridine to introduce quaternary ammonium groups therein.

8. A method according to claim 4, wherein said film-forming polymer is a copolymer of vinyl chloride and acrylonitrile.

9. A method according to claim 8, wherein said ion exchange groups are introduced by substituting halogen atom reactive sites in said ultrathin layer with a tertiary amino group.

10. A method according to claim 8, wherein said ion exchange groups are introduced by hydrolyzing nitrile group reactive sites in said ultrathin layer.

11. A method according to claim 10, further comprising reacting the resultant ion exchange layer with ethylenediamine to introduce tertiary amino groups therein.

12. A selectively permeable composite membrane prepared according to the process of claim 1.

13. A selectively permeable composite membrane prepared according to the process of claim 2.

14. A selectively permeable composite membrane prepared according to the process of claim 3.

15. A selectively permeable composite membrane prepared according to the process of claim 4.

16. A selectively permeable composite membrane prepared according to the process of claim 6.

17. A selectively permeable composite membrane prepared according to the process of claim 7.

18. A selectively permeable composite membrane prepared according to the process of claim 10.

19. A selectively permeable composite membrane prepared according to the process of claim 11.

* * * * *